United States Patent
DeCaire et al.

(10) Patent No.: US 8,772,213 B2
(45) Date of Patent: Jul. 8, 2014

(54) SOLVENT COMPOSITIONS INCLUDING TRANS-1-CHLORO-3,3,3-TRIFLUOROPROPENE AND USES THEREOF

(71) Applicant: Honeywell International Inc., Morristown, NJ (US)

(72) Inventors: Barbara Ruth DeCaire, Lancaster, NY (US); Ryan Hulse, Getzville, NY (US); Diana Mercier, Detroit, MI (US); Kane D. Cook, Eggertsville, NY (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/722,508

(22) Filed: Dec. 20, 2012

(65) Prior Publication Data

US 2013/0165363 A1 Jun. 27, 2013

Related U.S. Application Data

(60) Provisional application No. 61/578,948, filed on Dec. 22, 2011.

(51) Int. Cl.
*C11D 3/24* (2006.01)
*C11D 3/44* (2006.01)

(52) U.S. Cl.
USPC .......... 510/163; 510/164; 510/174; 510/182; 510/243; 510/412; 510/432

(58) Field of Classification Search
USPC .......... 510/163, 164, 174, 182, 243, 412, 432
See application file for complete search history.

(56) References Cited

U.S. PATENT DOCUMENTS

| 7,442,321 | B1 | 10/2008 | Chen et al. | |
| 7,935,268 | B2* | 5/2011 | Basu et al. | 252/67 |
| 7,985,299 | B2* | 7/2011 | Johnson et al. | 134/38 |
| 2010/0004155 | A1* | 1/2010 | Ishihara et al. | 510/506 |
| 2011/0041529 | A1* | 2/2011 | Chen et al. | 62/115 |
| 2012/0015863 | A1 | 1/2012 | Basu et al. | |
| 2012/0107513 | A1 | 5/2012 | Tamai et al. | |
| 2013/0090280 | A1* | 4/2013 | Basu et al. | 510/175 |

FOREIGN PATENT DOCUMENTS

WO 2011/089344 A1 7/2011

* cited by examiner

*Primary Examiner* — Charles Boyer
(74) *Attorney, Agent, or Firm* — Colleen D. Szuch

(57) ABSTRACT

The present invention relates to solvent compositions including an effective amount of 1-chloro-3,3,3-trifluoropropene and uses thereof. In certain aspects, such solvent compositions may be applied to the surface of an article or portion of an article having an ink or ink-based marking so as to remove the ink or ink-based marking without deleteriously impacting the article or surface of the article.

19 Claims, No Drawings

SOLVENT COMPOSITIONS INCLUDING TRANS-1-CHLORO-3,3,3-TRIFLUOROPROPENE AND USES THEREOF

CROSS-REFERENCE TO RELATED APPLICATIONS

The present application claims priority to U.S. Provisional Application Ser. No. 61/578,948, filed Dec. 22, 2011, the contents of which are incorporated herein by reference in its entirety.

FIELD OF THE INVENTION

The present invention relates to solvent compositions including 1-chloro-3,3,3-trifluoropropene (HCFO-1233zd), and in certain aspects to the use of such solvent compositions to removed debris, in certain aspects ink or ink-based markings, from a surface of an article or substrate.

BACKGROUND OF THE INVENTION

In the manufacture of a wide array of materials, ink or ink-based markings are often used as part of the manufacturing process. Such markings, for example, may be used in the manufacture of optical lenses (particularly progressive lenses—e.g. no-line bifocals, multi-focal lenses or gradient prescription lenses). They also may be used for metal machining, the manufacture of electro-mechanical and electrical parts, or in the manufacture of a wide-array components across a variety of industries including aerospace, nautical, automotive, optics, etc.

In certain aspects, such markings may be placed on the surface of two components that are designed to be linked, where the markings are used as a fixture for proper alignment of parts as they are coupled together. In other aspects, the mark may be used to convey information about that part, such as a quality issue within it or a specific area of it. It may also be used to mark a location of an important feature of a part (such as an optical center of a progressive lens) that may be useful to the manufacturer as the part is processed.

In each of these instances, the ink or ink-based markings must often be removed before the item is sold, finished, or otherwise used. Typically, removal is done using a solvent that is capable of dissolving the ink. It is desirable to have a solvent that removes the marking without damaging the substrate or article surface or any functional or aesthetic additives to the surface of the substrate or articles. It is further desirable that the solvent used be environmentally friendly, non-malodorous, and non-hazardous (e.g. low toxicity, low flammability, etc.)

SUMMARY OF THE INVENTION

In certain aspects, the present invention relates to solvent compositions that include an effective amount of 1-chloro-3,3,3-trifluoropropene (which may include the cis isomer, trans isomer and/or combinations thereof); at least one $C_1$-$C_3$ alcohol; and optionally at least one $C_4$-$C_6$ hydrocarbon, wherein the total amount of both the $C_1$-$C_3$ alcohol and $C_4$-$C_6$ hydrocarbon is from greater than 0 wt % to about 10 wt. %, based on the total weight of the composition.

The effective amount of 1-chloro-3,3,3-trifluoropropene may be any amount, as provided herein. In certain aspects, it is any amount where a reduction of marking is observed on the surface of a substrate or article, but without deleteriously impacting the integrity of the materials used to prepare the substrate or article or the coatings otherwise applied thereto. While the effective amount may be any amount provided herein, in certain aspects 1-chloro-3,3,3-trifluoropropene is provided between about 1% by weight to about 99% by weight of the composition. In further aspects, it is between about 5% to about 99% by weight, in even further aspects it is between about 5% to about 95% by weight, and in even further aspects it is an amount greater than 50% by weight of the composition.

The $C_1$-$C_3$ alcohol, in certain embodiments, may be selected from the group consisting of methanol, ethanol, isopropanol, and combinations thereof, and the $C_4$-$C_6$ hydrocarbon may be selected from the group consisting of n-pentane, isopentane, cyclopentane, hexane, and combinations thereof. In certain aspects of the foregoing, the alcohol is provided in an amount from greater than 0 weight % to about 10 weight percent, and in further embodiments in an amount from greater than 0 wt. % to about 5 wt. %. In even further embodiments, the alcohol is provided in an amount from greater than about 0% to about 5% and the hydrocarbon is provided in an amount from greater than about 0% to about 5%.

The solvent compositions of the present application may also comprise one or more additional components, other than a $C_1$-$C_3$ alcohol or $C_4$-$C_6$ hydrocarbon. Such components may include one or a combination of a co-solvent, an anticorrosive agent, surfactant, stabilizer, flammability suppressor, or inhibitor. While not limited thereto, co-solvents may include one or more of linear, branched and cyclic hydrocarbons (other than a $C_4$-$C_6$ hydrocarbon), halocarbons (including brominated and/or chlorinated halocarbons), $C_4$-$C_5$ alcohols, ketones, esters, ethers and acetals. Stabilizers may also include one or more of nitroalkanes, epoxy alkanes, or phosphite esters.

The compositions of the present invention may be used to remove an ink or ink-based marking from an article or a surface of an article by (a) providing an article having an ink or ink-based marking on at least a portion of its surface; (b) applying to the portion of the surface of the article with the ink or ink-based marking a solvent composition of the present invention; and (c) removing the solvent and ink or ink-based marking from the surface of the article.

The solvent compositions of the present invention may be applied to the surface of the article as a liquid, a sprayable composition, or a fabric or cloth, or using any other method known in the art or otherwise discussed herein. The article or surface of the article may be any defined herein. In certain aspects, it may include a material selected from the group consisting of a polymer, a metal or metal-based material, a metal alloy or metal-alloy based material, a cellulose or cellulose-based material, a cellulose-based composite, a silica or silica-based material, and a silica-based composite. In certain non-limiting aspects, the article is an optical lens, which optionally includes a polycarbonate material or coating.

In further non-limiting embodiments, the present invention relates to a method for removing an ink or ink-based marking from an article or a surface of an article comprising: (a) providing an article having an ink or ink-based marking on at least a portion of its surface wherein the ink or ink-based marking was applied during manufacturing of the article or portion of the article; (b) applying to the portion of the surface of the article with the ink or ink-based marking a solvent composition of the present invention; and (c) removing the solvent composition and the ink or ink-based marking from the surface of the article.

Additional embodiments and advantages will be readily apparent to one of skill in the art, based on the disclosure provided herein.

DETAILED DESCRIPTION OF THE INVENTION

The present invention relates to solvent compositions including 1-chloro-3,3,3-trifluoropropene (HCFO-1233zd or 1233zd). More specifically, it has been found that HCFO-1233zd is a particularly useful solvent for removing the ink or ink-based marking from the surface of certain substrates or articles. It is also demonstrated herein to remove such markings while having little or no deleterious effect on the substrate or article, coated or uncoated. In certain aspects, no deleterious effect on the substrate or article is demonstrated even after a 24 hour liquid exposure.

Compositions of the present invention are also low GWP, non-flammable or have low flammability and are expected to be a non-VOC. Accordingly, the present invention provides an environmentally friendly solvent that is able to remove dirt or debris from and article or from the surface of an article, as defined herein, without damaging material or any of the coatings thereon.

As used herein, the terms "1233zd" or "HCFO-1233zd" generically refer the compound 1-chloro-3,3,3 trifluoropropene (or 1,1,1 trifluoro-3-chloro-2-propene) and includes cis-HCFO-1233zd or trans-HCFO-1233zd. It, therefore, includes within its scope either cis-HCFO-1233zd or trans-HCFO-1233zd alone, but may also include combinations and mixtures of these in any proportion. In the latter context, the ratio of cis- to trans-HCFO-1233zd may be between 1 wt % to 99 wt % or 99 to 1 wt %, but the instant invention is not necessarily limited thereto.

For the purposes of convenience, the term "article" is used herein to refer to any product, part, component, substrate, and the like and is further intended to refer to any surface or portion thereof, particularly a surface or portion of a surface upon which an ink or ink-based marking is made. In certain aspects, such markings may be made during the manufacturing of the article and is a marking that is intended to be removed before the product is provided to a consumer. In alternative aspects, such markings are made by the end-consumer, purposefully or incidentally, and it is intended to be removed by the consumer. Examples of such articles, surfaces, etc. include, but are not limited to, optical lenses, electro-mechanical and electrical parts, or in any such article or surface used in manufacture of a wide-array components across a variety of industries including aerospace, nautical, automotive, optics, or the like.

The surface or article upon which the marking is made may include any surface or article known in the art for such use or any other use, including, but not limited to, articles and/or surfaces that include polymers (including elastomers and/or plastics), metal or metal-based materials, metal alloy or metal-alloy based materials, cellulose or cellulose-based materials, cellulose-based composites, silica or silica-based materials, silica-based composites, or the like. In certain aspects, the articles or surfaces are made, at least in part, from a metal or metal alloy substrate, examples of which include, but are not limited to, stainless steel, cold rolled steel, galvanized steel, aluminum, aluminum monel or inconel, copper, metal foils (e.g. copper or aluminum foils) magnesium/aluminum alloys, titanium, metal clad laminates (e.g. copper clad laminates, etc.) combinations thereof, or the like. In further embodiments, the articles or surfaces are made, at least in part, from a plastic, polymeric, or elastomeric material, examples of which include, but are not limited to, acrylonitrile butadiene styrene (ABS), polytetrafluoroethylene (PTFE), polyvinylidene fluoride (PVDF), acetal, polyethylene terphthalate (PET), high density polyethylene (HDPE), nylon, polyvinyl chloride (PVC), polycarbonate, polypropylene, fluoroelastomers (such as VITON® B Elastomer and KALREZ® 6375 ELASTOMER), polyurethane and polyurethane elastomers (such as TEXIN® 285 Elastomer), neoprene, and combinations thereof. Such articles or surfaces may include one or any combination of the foregoing, including, but not limited to, laminates, resin impregnated fabrics or cloths, or prepregnated materials such as phenolic cotton paper, cotton paper and epoxy, woven glass and epoxy, matte glass and polyester, non-woven glass and epoxy, woven glass and polyester, or the like. Additional surfaces and embodiments of the foregoing will be readily apparent to the skilled artisan.

As used herein, the term "no deleterious effect" or "no deleterious impact" means that the solvent substantially removes the ink or ink-based marking such that there is substantially little or, preferably, substantially no visible evidence that a marking was present on the surface of the article or that the solvent was used to remove the marking.

The amount of HCFO-1233zd contained in the solvent compositions can vary widely, depending the particular application. To this end, compositions may contain trace amounts of 1233zd in the composition or amounts of 1233zd approximating 100%. HCFO-1233zd may be provided alone or also as an azeotrope, azeotrope-like or non-azeotropic composition. In certain embodiments, HCFO-1233zd is provided in the solvent compositions in an effective amount that facilitates its final use in a solvent application. Such an effective amount may be any amount where a reduction of the ink or ink-based marking is observed on the surface of an article, but without deleteriously impacting the integrity of the materials used to prepare the article or the coatings, finish, etc. otherwise applied thereto. The effective amount may be from greater than 0% by weight to about 99% by weight, from about 1% to about 99%, from about 1% to about 95%, or from about 5% to about 95%, based on the total weight of the materials in the composition. In certain embodiments, the compositions include at least about 50% by weight of HCFO-1233zd, up to and including 100% by weight of HCFO-1233zd. In certain aspects of the present invention, HCFO-1233zd comprises, consists essentially of, or consists of cisHCFO-1233zd. In further embodiments, HCFO-1233zd comprises, consists essentially of, or consists of transHCFO-1233zd, and in even further embodiments HCFO-1233zd comprises, consists essentially of, or consists of cisHCFO-1233zd and transHFO-1233zd.

It is contemplated that the solvent compositions of the present invention includes embodiments wherein 1233zd is the solvent with or without the presence of any substantial amount of additional components being used for such purposes. In certain embodiments, however, one or more additional compounds or components may also be optionally provided as additional agents or adjuvants. Such additional agents or adjuvants may include co-solvents, anticorrosive agents, surfactants, stabilizers, flammability suppressors, inhibitors and other adjuvants which assist with or enhance the functionality of the composition. Non-limiting examples of co-solvents include linear, branched and cyclic hydrocarbons, halocarbons, including chlorinated and brominated compounds (e.g. trans-1,2-dichloroethylene), $C_1$-$C_5$ alcohols (e.g. methanol, ethanol, propanol, isopropanol, butanol), ketones, esters, ethers and acetals. Non-limiting examples of stabilizers include nitroalkanes, epoxy alkanes and phosphite esters. It will also be appreciated that such certain components may be added which exhibit multiple properties.

In certain embodiments, the compositions of the present invention include, as an additive or co-solvent, at least one alcohol and/or at least one hydrocarbon. In certain aspects of the invention, the alcohol(s) include any one or more $C_1$-$C_5$ alcohols, in certain non-limiting aspects, the alcohol(s) include at least one $C_1$-$C_3$ alcohol. Preferred, but non-limiting, alcohols may include methanol, ethanol, isopropanol, or combinations there.

The hydrocarbon additives may include any one or more linear, branched or cyclic hydrocarbon(s), which may also be substituted, unsubstituted, saturated, or unsaturated. In certain non-limiting aspects, the hydrocarbon includes at least one straight or branched chain $C_1$-$C_6$ hydrocarbon, preferably a $C_3$-$C_6$ hydrocarbon, and most preferably a $C_4$-$C_6$ hydrocarbon. Preferred, but non-limiting, examples of such hydrocarbons include, but are not limited to n-pentane, isopentane, cyclopentane, hexane, or the like.

In certain non-limiting aspects, the alcohol(s) and/or hydrocarbon(s) are independently provided in an amount from greater than 0 weight % to about 10 weight percent, based on the total weight of the composition. In further aspects, the combination of alcohol and/or hydrocarbon is between from greater than 0 weight % to about 10 weight percent, based on the total weight of the composition. To this end, and in certain aspects of the present invention, the composition includes solely the alcohol in an amount from greater than 0 weight % to about 10 weight percent, from greater than 0 wt. % to about 5 wt. %, based on the total weight of the composition. Alternatively, the composition includes at least one alcohol and at least one hydrocarbon, wherein the alcohol is provided in an amount from greater than about 0% to about 5% and the hydrocarbon is provided in an amount from greater than about 0% to about 5%, based on the total weight of the composition. Such effective amounts are not necessarily limiting to the invention and may be adjusted in accordance with the desirable features of the invention or the surface/article to be treated, in accordance with the objectives or other teachings herein.

The solvent compositions of the present invention may be provided or specifically formulated to remove any type of ink or ink-based marking used in the art, particularly during manufacturing for one or more of the reasons provided herein. In certain non-limiting aspects, such inks or in-based markings include layout fluids, marking inks or marking greases that are generally known.

The compositions of the present application are well adapted for use in the form of a liquid, aerosol and/or a sprayable composition or any form suitable for the purposes provided herein. With aerosol and sprayable compositions, it is contemplated that the present compositions may have one or more specific additives designed for this use, such as, but not limited to, propellants, atomizing agents and the like.

The solvent compositions of the present invention may be applied to the surface of an article or substrate using any method for removing dirt and debris therefrom. To this end, the surface of the article or substrate is contacted with the HCFO-1233zd compound or HCFO-1233zd-containing solvent composition of the present invention, where it dissolves or removes the ink or ink-based marking from the surface of the article or substrate. The solvent and ink or ink-based marking is then removed from the article surface by evaporation and/or by wiping or washing it away, etc. Additional methods of removing the solvent will be readily apparent to one of skill in the art.

Such methods may be specifically adapted for the desired uses. In certain aspects, as indicated above, the methods are specific to removing ink used during the manufacturing process. To this end, the compositions herein are adapted to remove the ink, without deleteriously impacting the article or surface of the article.

In certain non-limiting aspects, markings are applied to two parts that are intended to be joined. By way of non-limiting example, two such parts may be adjoining portions of a aerospace or nautical vessel (e.g. a plane, rocket, space shuttle, ship, boat, etc.) that must be properly aligned prior to being secured together. As noted above, in certain embodiments, such parts are aligned using one or more ink markings, where a marking is made on one portion of one part and a corresponding portion is made on one portion of the second part such that alignment of the two markings facilitates appropriate alignment of the two parts. Alternatively, such markings may be made to indicate the location of a specific point on such an article or to convey some other information about the article. After the two parts are secured together or the article is otherwise assembled, the solvent of the present invention is applied to remove the markings, as discussed herein. The solvent does not deleteriously impact the article or surface of the articles or any coating or additive provided thereto.

In certain non-limiting aspects, for example, the solvent of the present invention is applied to the surface of an optical lens, where a marking was made or applied during manufacturing or modification of the lens blank. Post-application, the solvent does not deleteriously impact the lens or surface of the lens (including lenses manufactured, at least in part, from a polycarbonate material) or any coating or additive provided thereto, such as tintable, anti-reflective, hydrophobic, oleophobic and other coatings.

The application of the present solvents is, again, not necessarily limited to an aerospace, nautical, or optical application. As otherwise indicated herein, the methods of using the solvents of the present invention also includes application in the mechanical, electro-mechanical or electrical industries, or may include any article or surface of an article otherwise defined herein and containing a marking, particularly and ink or ink-based marking, which is desired to be removed.

As an extension of the foregoing, the present invention is not necessarily limited to removal of a marking post-manufacturing. To this end, it may be used to remove ink, along with other debris, after use of the article or surface of the article by the end-user. Accordingly, while the solvent compositions may be adapted for use in a manufacturing setting, it also may be used by the end user of the article.

With regard to the latter, the solvent compositions may be applied with any manner consistent with such a use. In one embodiment, the solvent may be applied to a fabric or cloth and wiped or scrubbed onto the surface of the article so as to loosen or remove the ink or marking the article. Alternatively, the solvent may be provided as a sprayable composition where it is sprayed onto the surface of the article for ink removal. The article also may be immersed in the liquid solvent at an ambient or elevated temperature such that the ink or marking is lifted or removed from the article's surface. In any of the foregoing embodiments, the residual solvent and debris may be removed by evaporation, mechanical wiping of the article, and/or by rinsing with water, alcohol or alternative solvent solution.

Additional adaptations or embodiments will be readily apparent to one of skill in the art based on the disclosure provided herein.

EXAMPLES

Example 1

Cleaning Efficacy—Optical Lens

A progressive lens manufactured by Essilor was tested to see if HCFO-1233zd could remove the yellow ink markings.

The ink markings were completely removed using a cotton swab dipped in HCFO-1233zd. The lens surface was unaffected by exposure to HCFO-1233zd.

Example 2

Compatibility Testing—Optical Lens

Various optical lenses were partially submerged in an upright position in HCFO-1233zd for 24 hours. After exposure, the lenses were inspected visually for any changes in the surface. Lenses tested included CR-39 and polycarbonate substrates, some with scratch resistant or anti-reflective coatings. No changes to the exposed lens surfaces were noted on any of the tested lenses. The coatings were also unaffected by exposure to HFO-1233zd. Tested lenses are listed below:

| Vendor | Lens Description |
| --- | --- |
| Optima | ReSolution with Tantium scratch resistant coating |
| Nassau Vision Group | NALCO CR-39 hard resin |
| Essilor | Transitions VI Single Vision Airwear |
| Nassau Vision Group | Lighten Up Fast Tint, polycarbonate, tintable |
| Shore Lens Co. Inc | CR-39, with scratch coat |
| Essilor | Polycarbonate lens with Crizal antireflective coating |

Example 3

Cleaning Efficacy—Metal Surface

Removal of Dykem Steel Blue Layout Fluid (dye) from a metal surface was tested using (1) 96wt % trans-1233zd and 4 wt % methanol and (2) 93 wt % trans-1233zd, 2 wt % methanol, and 5 wt % pentane. Tests consisted of spraying an Aluminum coupon with Dykem dye and the placing the coupon in septum screw top vial that had approximately 20-25 ml. of designated test cleaning solvent. Results showed the trans-1233zd/methanol and trans-1233zd/methanol/Pentane azeotrope removed Dykem dye. While both mixtures were able to remove the Dykem dye it appeared to be removed in different ways. The trans-1233zd/methanol dissolved the dye while the trans-1233zd/methanol/Pentane blend appeared to lift the dye from the surface without completely dissolving it. Both mixtures were found to be effective in dye removal.

What is claimed is:

1. A method for removing an ink or ink-based marking from an optical lens or a surface of an optical lens comprising:
   providing an optical lens having an ink or ink-based marking on at least a portion of its surface, wherein at least a portion of the lens comprises a plastic, polymeric, or elastomeric material;
   applying to the portion of the surface of the optical lens with the ink or ink-based marking a solvent composition comprising an effective amount of trans-1-chloro-3,3,3-trifluoropropene and at least one $C_1$-$C_3$ alcohol;
   removing the solvent composition and the ink or ink-based marking from the surface of the optical lens.

2. The method of claim 1, wherein the solvent composition is applied as a liquid.
3. The method of claim 1, wherein the solvent composition is applied as a sprayable composition.
4. The method of claim 1, wherein the solvent composition is applied to a fabric or cloth, which is then used to apply the solvent composition to the surface of an article.
5. The method of claim 1, wherein the optical lens includes a polycarbonate material or coating.
6. The method of claim 1, wherein the solvent composition further comprises at least one $C_4$-$C_6$ hydrocarbon, wherein the total amount of both the $C_1$-$C_3$ alcohol and $C_4$-$C_6$ hydrocarbon is from greater than 0 wt % to about 10 wt %, based on the total weight of the solvent composition.
7. The method of claim 1, wherein the $C_1$-$C_3$ alcohol is selected from the group consisting of methanol, ethanol, isopropanol and combinations thereof.
8. The method of claim 6, wherein the $C_4$-$C_6$ hydrocarbon is selected from the group consisting of n-pentane, isopentane, cyclopentane, hexane and combinations thereof.
9. The method of claim 1, wherein the alcohol is provided in an amount from greater than 0 weight % to about 10 weight percent, based on the total weight of the solvent composition.
10. The method of claim 1, wherein the alcohol is provided in an amount from greater than 0 wt. % to about 5 wt. %, based on the total weight of the solvent composition.
11. The method of claim 6, wherein the alcohol is provided in an amount from greater than about 0% to about 5% and the hydrocarbon is provided in an amount from greater than about 0% to about 5%, based on the total weight of the solvent composition.
12. The method of claim 1, wherein trans-1-chloro-3,3,3-trifluoropropene is provided in an amount between about 1% by weight to about 99% by weight, based on the total weight of the solvent composition.
13. The method of claim 1, wherein trans-1-chloro-3,3,3-trifluoropropene is provided in an amount between about 5% by weight to about 99% by weight, based on the total weight of the solvent composition.
14. The method of claim 1, wherein trans-1-chloro-3,3,3-trifluoropropene is provided in an amount between about 5% to about 95% by weight, based on the total weight of the solvent composition.
15. The method of claim 1, wherein trans-1-chloro-3,3,3-trifluoropropene is provided in an amount greater than 50% by weight, based on the total weight of the solvent composition.
16. The method of claim 1, further comprising at least one additional component, other than a $C_1$-$C_3$ alcohol or $C_4$-$C_6$ hydrocarbon, selected from the group consisting of a co-solvent, an anticorrosive agent, surfactant, stabilizer, flammability suppressor, inhibitor and combinations thereof.
17. The method of claim 16, wherein the additional component comprises a co-solvent.
18. The method of claim 16, wherein the additional component comprises a stabilizer.
19. The method of claim 1, wherein the solvent exhibits substantially no deleterious effect on the optical lens.

* * * * *